US009877272B2

(12) United States Patent
Cherian et al.

(10) Patent No.: US 9,877,272 B2
(45) Date of Patent: Jan. 23, 2018

(54) INITIAL SCAN ENHANCEMENTS

(71) Applicant: QUALCOMM Incorporated, San Diego, CA (US)

(72) Inventors: George Cherian, San Diego, CA (US); Abhishek Pramod Patil, San Diego, CA (US); Santosh Paul Abraham, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 123 days.

(21) Appl. No.: 14/665,741

(22) Filed: Mar. 23, 2015

(65) Prior Publication Data

US 2015/0282056 A1 Oct. 1, 2015

Related U.S. Application Data

(60) Provisional application No. 61/970,261, filed on Mar. 25, 2014.

(51) Int. Cl.
*H04W 48/16* (2009.01)
*H04W 48/08* (2009.01)
(Continued)

(52) U.S. Cl.
CPC ........... *H04W 48/16* (2013.01); *H04W 48/08* (2013.01); *H04W 36/0083* (2013.01); *H04W 84/12* (2013.01)

(58) Field of Classification Search
None
See application file for complete search history.

(56) References Cited

U.S. PATENT DOCUMENTS

2005/0124294 A1* 6/2005 Wentink ............ H04W 72/1263
455/41.2
2012/0106370 A1* 5/2012 Radulescu ........ H04W 36/0083
370/252

(Continued)

OTHER PUBLICATIONS

CISCO: "Fils Reduced Neighbor Report; 11-12-1054-01-00ai-fils-reduced-neighbor-report", IEEE SA Mentor; 11-12-1054-01-00A1-Fils-Reduced-Neighborreport, IEEE-SA Mentor, Piscataway, NJ, USA, vol. 802.11ai, No. 1, Sep. 17, 2012 (Sep. 17, 2012), pp. 1-19, XP068039737, [retrieved on Sep. 17, 2012).

(Continued)

*Primary Examiner* — Mohammad Adhami
(74) *Attorney, Agent, or Firm* — Arent Fox LLP (57) ABSTRACT

A method, an apparatus, and a computer program product for wireless communication are provided. In one aspect, an apparatus includes a processor configured to send a request to at least one station associated with the apparatus to scan for information related to at least one neighboring access point (AP) operating in a neighborhood of the apparatus and report the information to the apparatus, receive from the at least one associated station a report including the information, generate a neighborhood report related to the at least one neighboring AP, the neighborhood report including the information received from the at least one associated station, and transmit the neighborhood report to one or more other stations not associated with the apparatus to facilitate discovery of an AP of interest to the one or more other stations.

28 Claims, 7 Drawing Sheets

(51) Int. Cl.
*H04W 36/00* (2009.01)
*H04W 84/12* (2009.01)

(56) References Cited

U.S. PATENT DOCUMENTS

| | | | |
|---|---|---|---|
| 2013/0079003 A1 | 3/2013 | Nagaraja et al. | |
| 2013/0088983 A1* | 4/2013 | Pragada ............... | H04W 16/14 370/252 |
| 2015/0098459 A1* | 4/2015 | Lee ....................... | H04W 48/16 370/338 |
| 2015/0208330 A1* | 7/2015 | Park ..................... | H04W 48/16 370/338 |

OTHER PUBLICATIONS

International Search Report and Written Opinion—PCT/US2015/022172—ISA/EPO—Aug. 6, 2015.

Measurement: "Draft Supplement to Standard for Telecommunications and Information Exchange Between Systems LAN/MAN Specific Requirements-Part 11: Wireless Medium Access Control (MAC) and physical layer (PHY) specifications: Specification for Radio Resource Measurement; 802.11k-D0.17", IEEE Draft; 802.11K-D0.17, IEEE-SA, Piscataway, NJ, USA, vol. 802.11k, No. D0.17, Jul. 16, 2004 (Jul. 16, 2004), pp. 1-110, XP017646706, [retrieved on Jul. 16, 2004].

Merlin S., "Short Beacon; 11-12-0129-03-00ah-short-beacon", IEEE SA Mentor; 11-12-0129-03-00AH-Short-Beacon, IEEE-SA Mentor, Piscataway, N, USA, vol. 802.11ah, No. 3, May 14, 2012 (May 14, 2012), pp. 1-21, XP068038246, [retrieved on May 14, 2012].

* cited by examiner

INITIAL SCAN ENHANCEMENTS

CROSS-REFERENCE TO RELATED APPLICATION(S)

This application claims the benefit of U.S. Provisional Application Ser. No. 61/970,261, entitled "INITIAL SCAN ENHANCEMENTS" and filed on Mar. 25, 2014, which is expressly incorporated by reference herein in its entirety.

BACKGROUND

Field

The present disclosure relates generally to communication systems, and more particularly, to obtaining neighboring access point (AP) information and facilitating efficient AP discovery at a station based on the neighboring AP information.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved narrowband channel selection for devices in a wireless network.

One aspect of this disclosure provides an apparatus for wireless communication including a processing system. The processing system is configured to send a request to at least one station associated with an access point (AP) to scan for information related to at least one neighboring AP operating in a neighborhood of the AP and report the information to the AP, receive from the at least one associated station a report including the information, generate a neighborhood report related to the at least one neighboring AP, the neighborhood report including the information received from the at least one associated station, and transmit the neighborhood report to one or more other stations not associated with the AP to facilitate discovery of an AP of interest to the one or more other stations.

Another aspect of this disclosure provides a method of wireless communication at an apparatus including sending a request to at least one station associated with an access point (AP) to scan for information related to at least one neighboring AP operating in a neighborhood of the AP and report the information to the AP, receiving from the at least one associated station a report including the information, generating a neighborhood report related to the at least one neighboring AP, the neighborhood report including the information received from the at least one associated station, and transmitting the neighborhood report to one or more other stations not associated with the AP to facilitate discovery of an AP of interest to the one or more other stations.

One aspect of this disclosure provides an apparatus for wireless communication including means for sending a request to at least one station associated with an access point (AP) to scan for information related to at least one neighboring AP operating in a neighborhood of the AP and report the information to the AP, means for receiving from the at least one associated station a report including the information, means for generating a neighborhood report related to the at least one neighboring AP, the neighborhood report including the information received from the at least one associated station, and means for transmitting the neighborhood report to one or more other stations not associated with the AP to facilitate discovery of an AP of interest to the one or more other stations.

Another aspect of this disclosure provides a computer program product for wireless communications at an apparatus, the computer program product comprising a computer-readable medium having instructions executable to send a request to at least one station associated with an access point (AP) to scan for information related to at least one neighboring AP operating in a neighborhood of the AP and report the information to the AP, receive from the at least one associated station a report including the information, generate a neighborhood report related to the at least one neighboring AP, the neighborhood report including the information received from the at least one associated station, and transmit the neighborhood report to one or more other stations not associated with the AP to facilitate discovery of an AP of interest to the one or more other stations.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, connection point, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, terminology that recites at least one of a combination of elements (e.g., "at least one of A, B, or C") refers to one or more of the recited elements (e.g., A, or B, or C, or any combination thereof).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Figure 1:
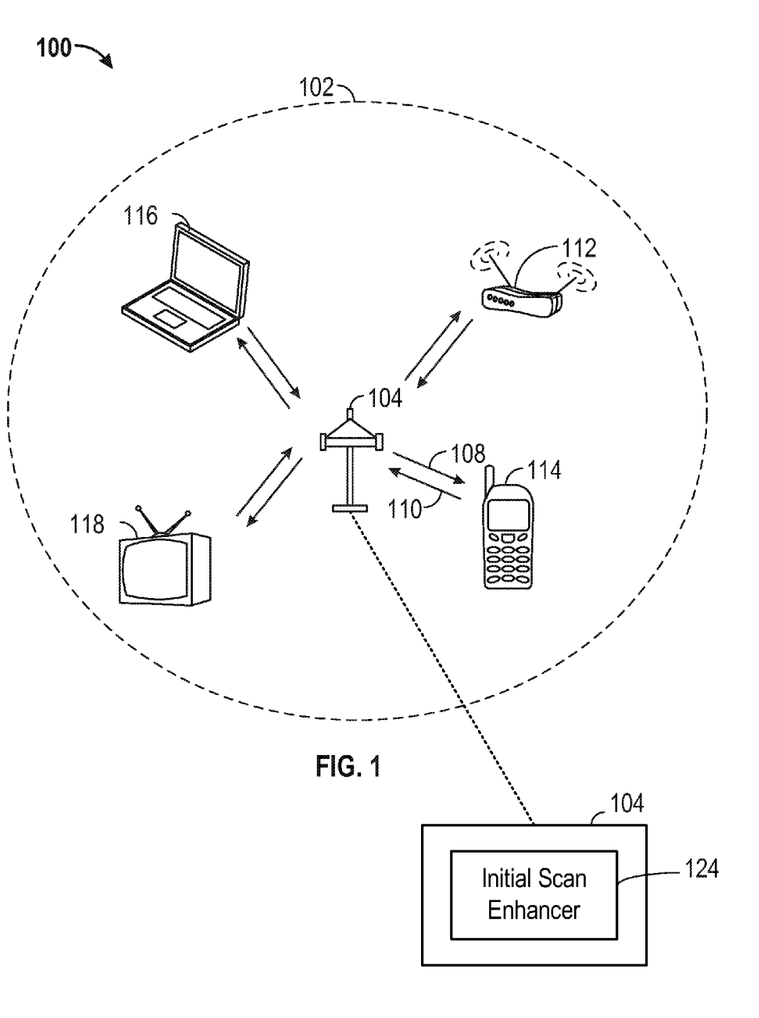
FIG. 1 shows an example wireless communication system in which aspects of the present disclosure may be employed.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. The AP 104 along with the STAs associated with the AP 104 and that use the AP 104 for communication may be referred to as a basic service set (BSS). It should be noted that the wireless communication system 100 may not have a central AP 104, but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g., shared) amongst several devices, and information specific to a given device.

In an aspect, the AP 104 may include an initial scan enhancer 124. The initial enhancer 124 may perform, or facilitate the performance of, any of the operations described below with respect to FIGS. 3 and 4. For example, the initial scan enhancer 124 may be configured to perform/facilitate the sending of a request to a STA (e.g., any one of STAs 111, 114, 116, or 118) associated with the AP 104 to scan for information related to a neighboring AP operating in a neighborhood of the AP 104 and report the information to the AP 104. The initial scan enhancer 124 may further be configured to perform/facilitate the generating of a neighborhood report related to the neighboring AP, wherein the neighborhood report may include the information received from the STA. The initial scan enhancer 124 may also be configured to perform/facilitate the transmitting of the neighborhood report to other STAs not associated with the AP 104 to facilitate discovery of an AP of interest to the other STAs.

In some aspects, a STA (e.g., STA 116) may be required to associate with the AP 104 in order to send communications to and/or receive communications from the AP 104. In one aspect, information for associating is included in a beacon broadcast by the AP 104. To receive such a beacon, the STA 116 may, for example, perform a broad coverage search over a coverage region. A search may also be performed by the STA 116 by sweeping a coverage region in a lighthouse fashion, for example. After receiving the information for associating, the STA 116 may transmit a reference signal, such as an association probe or request, to the AP 104. In some aspects, the AP 104 may use backhaul services, for example, to communicate with a larger network, such as the Internet or a public switched telephone network (PSTN).

Figure 2:
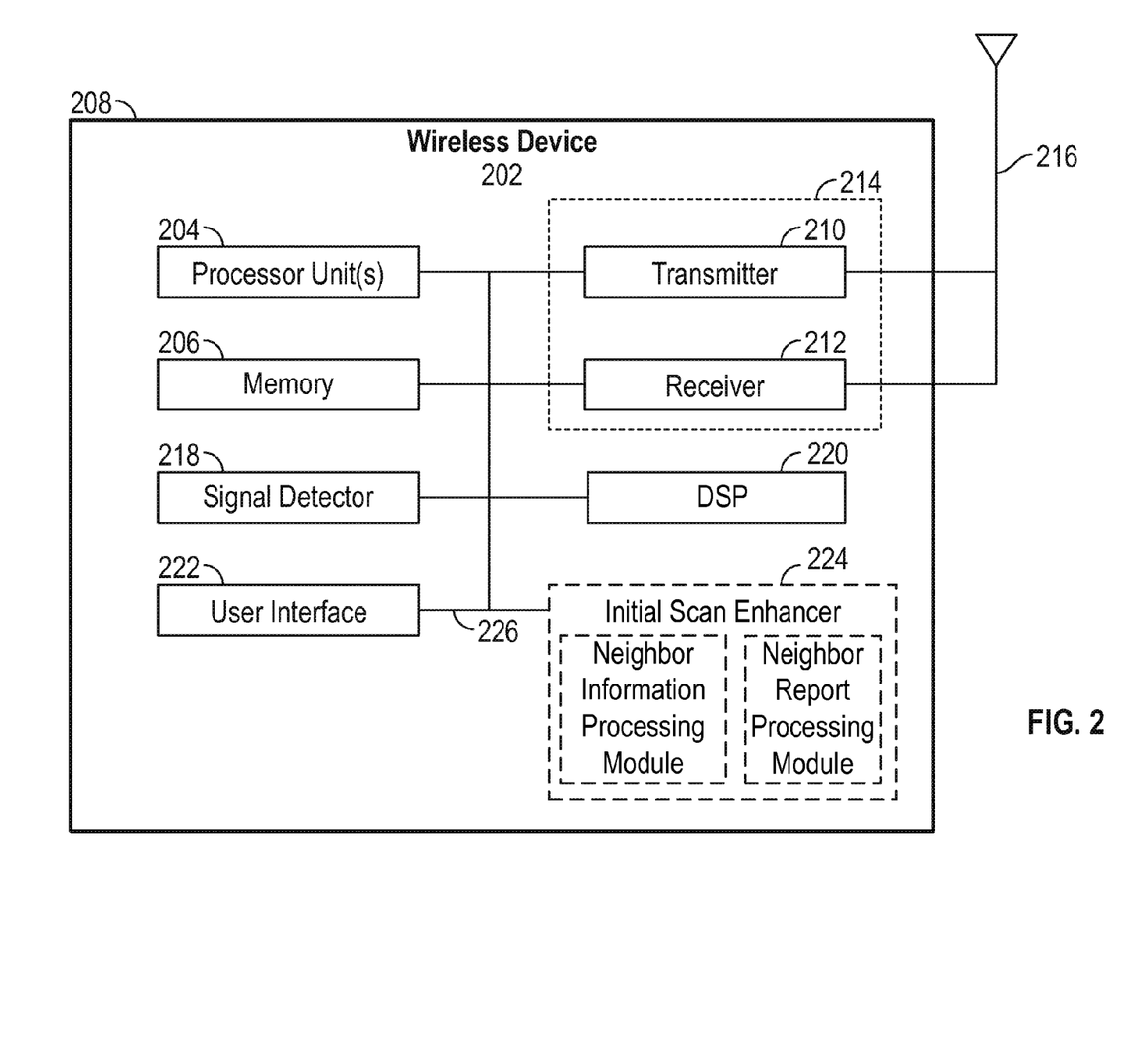
FIG. 2 shows a functional block diagram of an example wireless device that may be employed within the wireless communication system of FIG. 1.

FIG. 2 shows an example functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 112, 114, 116, and 118.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

When the wireless device 202 is implemented as an AP (e.g., AP 104), the wireless device 202 may also comprise an initial scan enhancer 224 including a neighbor information processing module and a report processing module. The initial scan enhancer 224 may perform, or facilitate the performance of sending (via the neighbor information processing module and the transceiver 214) a request to a STA (e.g., any one of STAs 111, 114, 116, or 118) associated with the wireless device 202 to scan for information related to a neighboring AP operating in a neighborhood of the wireless device 202 and report the information to the wireless device 202. The initial scan enhancer 224 may further be configured to perform/facilitate generating (via the report processing module, the processor 204, and/or memory 206) a neighborhood report related to the neighboring AP, wherein the neighborhood report may include the information received from the STA (via the transceiver 214). The initial scan enhancer 224 may also be configured to perform/facilitate transmitting (via the report processing module and the transceiver 214) the neighborhood report to other STAs not associated with the wireless device 202 to facilitate discovery of an AP of interest to the other STAs.

The various components of the wireless device 202 may be coupled together by a bus system 226. The bus system 226 may include a data bus, for example, as well as a power bus, a control signal bus, and a status signal bus in addition to the data bus. Components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218, the DSP 220, the user interface 222, and/or the initial scan enhancer 224. Further, each of the components illustrated in FIG. 2 may be implemented using a plurality of separate elements.

In an aspect, when a STA (e.g., STA 116) is near an AP 104 a user of the STA 116 may desire the STA 116 to quickly connect (associate) with the AP 104. A standard specification (e.g., upcoming IEEE 802.11ai standard specification) may provide for fast link setup. For example, an AP may help a STA quickly setup a link with an AP of interest to the STA by providing the STA with information regarding other APs within a neighborhood of (surrounding) the AP. The information may be provided via a reduced neighbor report information element (IE) that may be transmitted in a beacon and/or a probe response. The present disclosure provides for an AP that sends to a STA a neighborhood report, such as a new type of reduced neighbor report IE that includes information identifying all APs in the neighborhood and/or information specifying how the AP gathers the information for the reduced neighbor report IE. Hence, because the reduced neighbor report IE of the present disclosure is comprehensive of the APs in the neighborhood, the STA will not be compelled to scan all relevant channels (perform "legacy" scanning) to find an AP of interest (e.g., home AP), and therefore reduce delay. For example, when the STA receives the neighborhood report, the STA can quickly locate the AP of interest for link setup and forgo the scan of all relevant channels (forgo "legacy" scanning) during an initial scanning operation.

Figure 3:
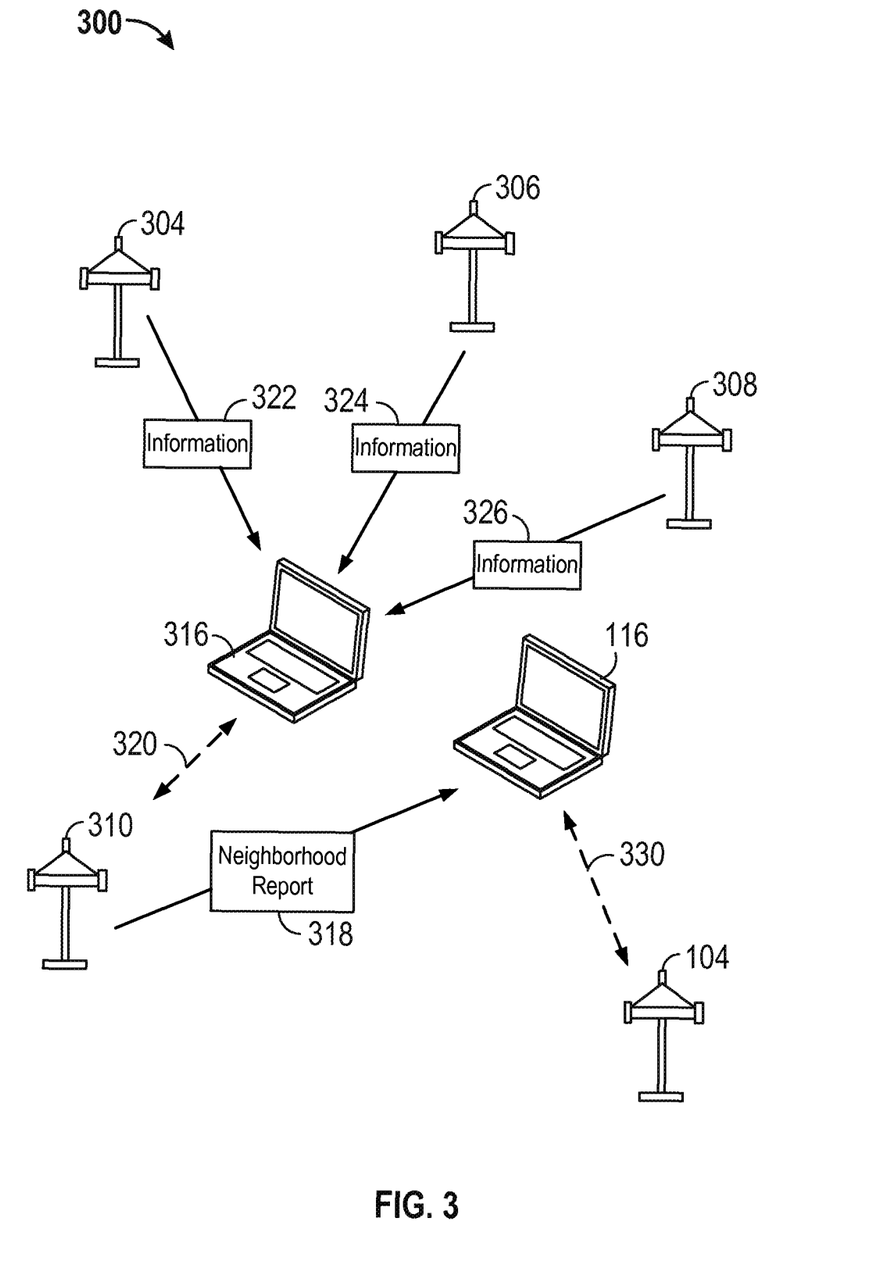
FIG. 3 is a diagram illustrating enhanced initial scanning operations.

FIG. 3 is a diagram 300 illustrating enhanced initial scanning operations. In an example, a STA 116 that is unassociated with an AP may typically prefer to connect to a home AP 104. However, if there exists other APs (e.g., AP 304, AP 306, or AP 308) with a strong signal near the STA 116, the STA 116 may connect to one of the other APs instead of the preferred home AP 104. To prevent the STA 116 from connecting with the other APs with the strong signal, any AP (e.g., AP 310) near the STA 116 may provide the STA 116 with a neighborhood report (e.g., reduced neighbor report IE) 318 identifying/advertising all APs (including the home AP 104) within the neighborhood. Based on the neighborhood report, the STA 116 may learn of the preferred home AP 104 and setup a link (association) 330 with the home AP 104 accordingly, thus preventing the STA 116 from connecting with the other APs with the strong signal. The neighborhood report further allows the STA 116 to quickly locate the home AP 104 and avoid the delay of having to scan all relevant channels to find the home AP 104 during an initial scanning operation.

In an aspect, a standard specification (IEEE 802.11, IEEE 802.11k), for example, allows the AP 310 to communicate 320 with a STA (e.g., STA 316) that is associated with the AP 310 to help the AP 310 gather information regarding other APs surrounding the STA 316. For example, when the AP 310 is not within a communication range of the surrounding APs, the AP 310 may utilize the STA 316 that is in close proximity to the surrounding APs to gather information for the AP 310. The STA 316 may gather information 322, 324, and 326 regarding APs 304, 306, and 308, respectively, from which the STA 316 can receive a signal and report the gathered information to the AP 310.

In an aspect, the AP 310 may request the associated STA 316 to gather information regarding surrounding/neighboring APs via a measurement request (or beacon request) as defined in IEEE 802.11 (IEEE 802.11k), for example. The associated STA 316 may provide the information regarding the surrounding/neighboring APs to the AP 310 via a measurement report (or beacon report) as defined in IEEE 802.11 (IEEE 802.11k), for example. In an aspect, the AP 310 that is to send a reduced neighbor report IE may learn of neighboring APs by being configured to send the measurement request and receive the measurement report.

Information in the reduced neighbor report IE (or neighborhood report) may include an AP subnet, an AP domain, an AP operating channel, and a beacon time interval/offset. Thus, a STA attempting to locate an AP of interest (e.g., home AP) will know when and which channel to listen for a next beacon from the preferred (e.g., home) AP. The beacon may include information such as AP capability, AP operating channel, and AP domain. However, the reduced neighbor report IE may not include a subscriber set identifier (SSID) for identifying an AP. Although the reduced neighbor report IE may include a basic service set identifier (BSSID), the BSSID may not help the STA find the AP of interest. Accordingly, the STA cannot learn from the beacon whether an AP is an AP of interest (home AP). In an aspect, the measurement report may be modified to include an AP identifier (e.g., AP SSID information). The AP learns of the AP identifier (AP SSID information) when a measurement report is received and includes the AP identifier in a reduced neighbor report IE broadcast. The STA may then determine whether an AP is an AP of interest based on the AP identifier included in a received reduced neighbor report IE. In an aspect, the measurement report and reduced neighbor report IE may be modified to include a shortened version of the AP SSID information (e.g., hash value of the SSID) to minimize a message size.

Figure 4A:
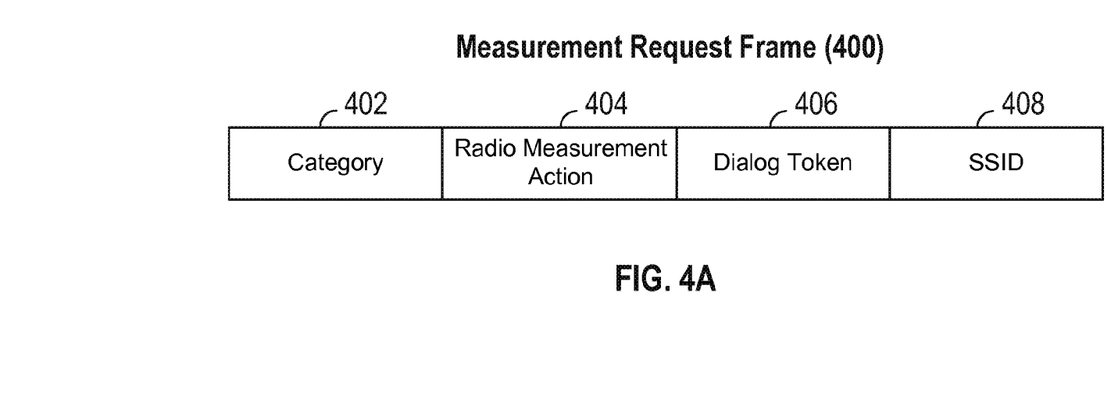
FIG. 4A is a diagram illustrating an example of a measurement request frame format.

FIG. 4A is a diagram illustrating an example format of a measurement request frame 400 (e.g., neighbor report request frame format). The measurement request frame 400 may be transmitted by an AP to a STA to request the STA to gather information regarding surrounding/neighboring APs. The measurement request frame 400 may further be transmitted by the STA to an AP to request the AP to gather information regarding the surrounding/neighboring APs. Referring to FIG. 4A, the measurement request frame 400 may include a Category field 402, a Radio Measurement Action field 404, a Dialog Token field 406, and an SSID field 408. The Category field 402 may, for example, have a size of one octet and be set to a value indicating a radio measurement category. The Radio Measurement Action field 404 may, for example, have a size of one octet and be set to a value indicating a request for a neighbor report. The Dialog Token field 406 may, for example, have a size of one octet and be set to a nonzero value to identify the request/report transaction. The SSID field 408 may, for example, have a size of 0 to 32 octets. The presence of the SSID field 408 indicates a request for a neighbor list for a specified SSID.

Figure 4B:
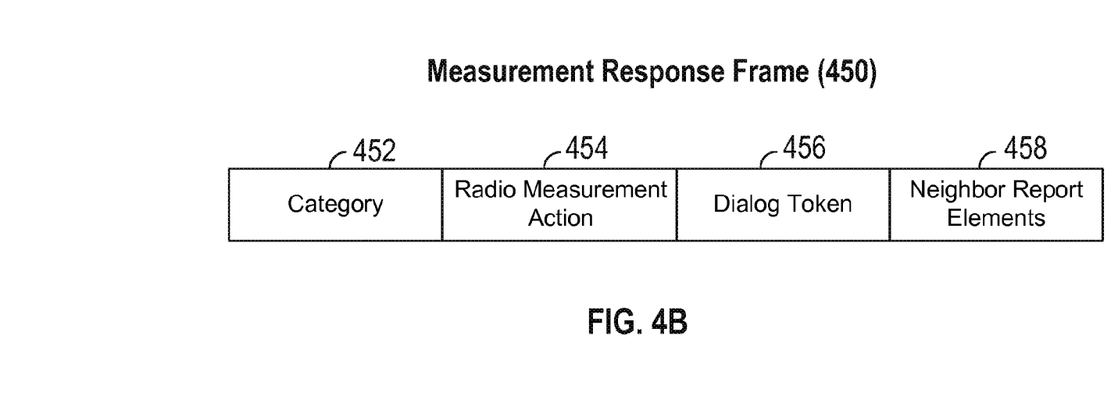
FIG. 4B is a diagram illustrating an example of a measurement response frame format.

FIG. 4B is a diagram illustrating an example format of a measurement response frame 450 (e.g., neighbor report response frame format). The measurement response frame 450 (or measurement report frame) may be transmitted by a STA and/or AP in response to the measurement request frame 400 (neighbor report request frame). Referring to FIG. 4B, the measurement response 450 frame may include a Category field 452, a Radio Measurement Action field 454, a Dialog Token field 456, and an Neighbor Report Elements field 458. The Category field 452 may, for example, have a size of one octet and be set to a value indicating the radio measurement category. The Radio Measurement Action field 454 may, for example, have a size of one octet and be set to a value indicating a neighbor report response. The Dialog Token field 456 may, for example, have a size of one octet and be set to the value corresponding to the measurement request frame. The Neighbor Report Elements field 458 may, for example, have a variable size and contain neighbor report elements, including SSID information, for validated APs.

Figure 5:
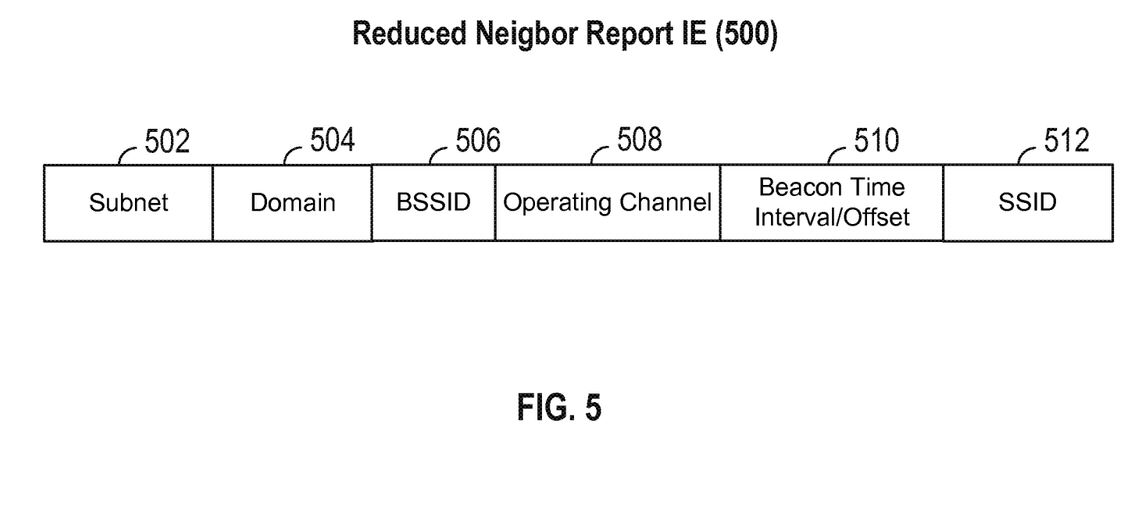
FIG. 5 is a diagram illustrating an example of a reduced neighbor report information element (IE).

FIG. 5 is a diagram illustrating an example of a reduced neighbor report information element (IE) 500 (or reduced neighbor report). The reduced neighbor report IE 500 may be generated based on a received measurement response frame (e.g., measurement response frame 450). The reduced neighbor report IE 500 may be transmitted from an AP to a STA to inform the STA of all APs (including a home AP) within a neighborhood of the STA. Based on the reduced neighbor report IE, the STA may learn of an AP of interest (e.g., preferred home AP) and setup a link (association) with the AP of interest, thus preventing the STA from attempting to connect with a non-preferred AP. Referring to FIG. 5, the reduced neighbor report IE 500 may include an AP subnet 502, an AP domain 504, a BSSID 506, an AP operating channel 508, and a beacon time interval/offset 510. The reduced neighbor report IE 500 may further include SSID information 512 associated with the AP to indicate whether the AP may be of interest to the STA.

In an aspect, the AP may broadcast the reduced neighbor report IE 500 (reduced neighbor report) in a beacon or a Fast Initial Link Setup (FILS) Discovery frame (as may be defined by IEEE 802.11 (upcoming IEEE 802.11ai standard specification)) after the AP has learned of all the neighboring APs via the measurement response frame 450 (measurement report). A new STA (STA unassociated with an AP) may receive the reduced neighbor report IE 500 while listening to the beacon/FILS Discovery frame broadcast. The new STA may also receive the reduced neighbor report IE 500 as part of a probe response sent by the AP in response to the new STA's probe request sent to the AP. Prior to the AP receiving the measurement response frame 450, the AP may not be aware of the neighboring APs. Thus, the AP will not broadcast/send the reduced neighbor report IE 500. In an aspect, even after the AP begins receiving neighborhood information via the measurement response frame 450, the AP may not broadcast/send the reduced neighbor report IE 500 including the neighborhood information for some time. This is to ensure that the AP does not broadcast/send the reduced neighbor report IE 500 before the AP has learned of all of the neighboring APs surrounding the AP. For example, a first measurement response frame received by the AP may not identify all of the neighboring APs. Therefore, if the AP were to broadcast the reduced neighbor report IE 500 as soon as the AP receives the first measurement response frame, then the reduced neighbor report IE 500 may not identify all of the neighboring APs since the first measurement response frame may not identify all of the neighboring APs. However, over time, the AP will begin receiving a measurement response frame identifying all of the neighboring APs. As such, the AP may start broadcasting the reduced neighbor report IE 500 via beacon transmissions to the STA since all of the neighboring APs can be identified in the reduced neighbor report IE 500. Consequently, the scan time of the STA will decrease as the STA will be able to find the home AP in a reduced amount of time based on the reduced neighbor report IE 500.

In an aspect, neighborhood information can change daily or periodically (i.e., the presence of neighboring APs may not be static). For example, existing neighboring APs may enter and leave a network. Moreover, new APs may enter the network. Accordingly, an AP may send the measurement request frame 400 to one or more STAs periodically (e.g., twice a day, once a day, once a week) to gather current information on neighboring APs. In an example, the AP may request the STA to send management frames on a particular channel to solicit a response from any APs, and send a report of the APs that provide the response. The AP may send the request to a number of STAs. In an aspect, the AP may request the STAs to send the management frames on different channels. Thus, the AP may learn of the existence of neighboring APs operating on the different channels.

In an aspect, when the STA receives the reduced neighbor report IE 500 from a beacon or probe response, the STA will use the information regarding the neighboring APs included in the reduced neighbor report IE 500 to discover an AP of interest (e.g., home AP). In an aspect, the reduced neighbor report IE includes reduced versions of certain information or reduced fields. For example, the reduced neighbor report IE 500 may be modified to include a shortened version of a neighboring AP identifier (SSID). In an aspect, a shortened version of an SSID may be a hash value of the SSID. For example, the SSID may be modified by a 16-bit CRC or a 32-bit CRC. In an aspect, the STA may perform a preferred network offload (PNO) scan and a roaming scan using the reduced neighbor report IE 500 to quickly scan a number of APs to discover an AP of interest. In a further aspect, the reduced neighbor report IE may omit certain information or certain fields.

In an aspect, the AP may transmit a Fast Initial Link Setup (FILS) Discovery frame (as may be defined by IEEE 802.11 (upcoming IEEE 802.11 ai standard specification)) to inform a STA of neighboring APs. For example, the FILS Discovery frame may include the reduced neighbor report IE 500 mentioned above. The FILS Discovery frame may be transmitted on a predefined social channel (e.g., common channel) supported by all neighboring APs and STAs.

In an aspect, the AP transmitting the FILS Discovery frame on the social channel may indicate/advertise an availability of the AP as well as an availability of all neighboring APs (e.g., via the reduced neighbor report IE 500). Accordingly, a STA camping on the social channel may quickly learn of the availability of all APs and discover an AP of interest (home AP) by receiving the FILS Discovery frame. The STA avoids having to perform a prolonged "legacy" scan to discover the AP of interest when the AP of interest is included in the FILS Discovery frame. However, if the AP of interest to the STA is not included in the FILS Discovery frame (e.g., because the AP of interest does not support IEEE 802.11ai or an SSID of interest is hosted on a legacy AP), then the STA will perform a "legacy" scan to discover the AP of interest.

In an aspect, prior to the AP transmitting the FILS Discovery frame, the AP may transmit a clear-to-send (CTS) signal on an operating channel of the AP to disable communication on the operating channel. This allows STAs that are currently being serviced by the AP to suspend communication with the AP. While communication on the operating channel is suspended, the AP may move to the social channel to send the FILS Discovery frame. Once the FILS Discovery frame is transmitted, the AP may return to the operating channel to resume communication with the STAs serviced by the AP. In an aspect, transmission of the CTS signal is not necessary if the FILS discovery frame is sent on the AP's operating channel or the social channel is the same as the AP's operating channel. In another aspect, transmission of the CTS signal is not necessary if the AP is a dual-band AP. For example, when the AP includes one radio chain capable of operating on the social channel for sending the FILS Discovery frame and another radio chain capable of simultaneously operating on a primary channel for serving a STA, the AP need not send the CTS signal prior to transmitting the FILS Discovery frame. The radio chain operating on the FILS Discovery frame social channel may have minimal association while mostly serving STAs enabled for IEEE 802.11ai.

Figure 6:
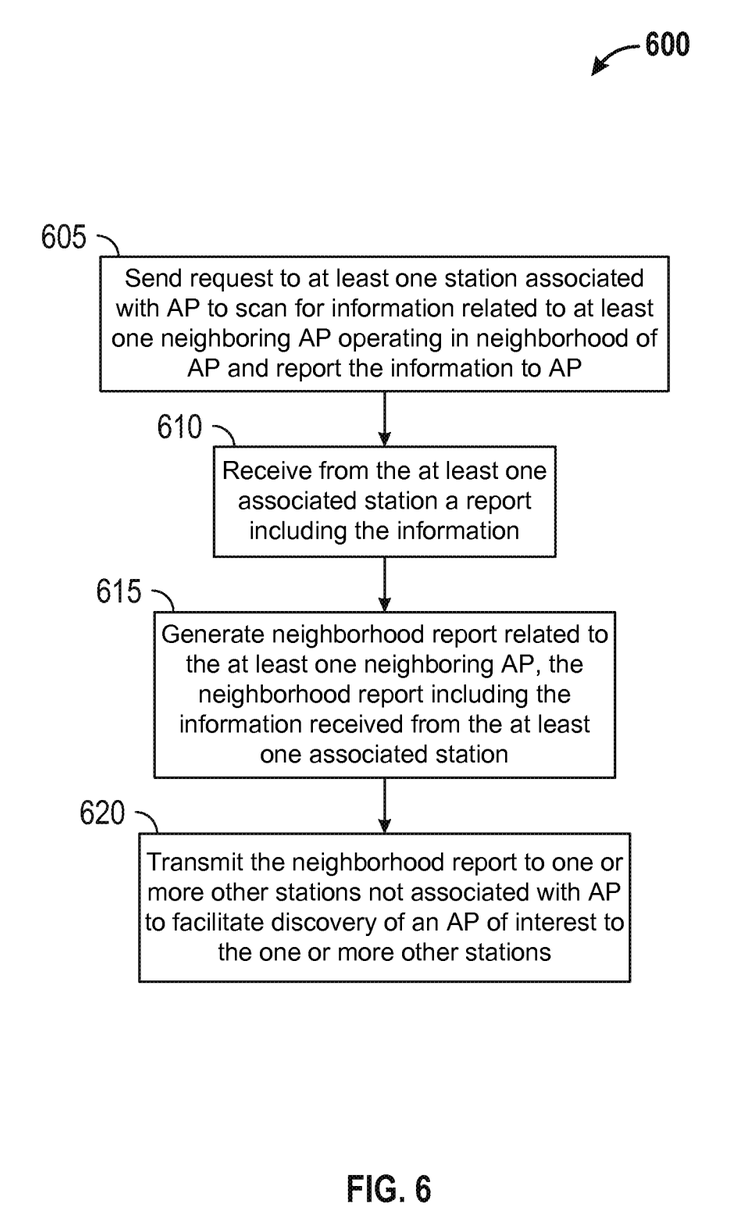
FIG. 6 is a flowchart of an example method of wireless communication.

FIG. 6 is a flowchart of an example method 600 of wireless communication. The method 600 may be performed using an apparatus (e.g., the wireless device 202 of FIG. 2, for example). The apparatus may be implemented as an AP (e.g., AP 310 of FIG. 3), for example. Although the process 600 is described below with respect to the elements of wireless device 202 of FIG. 2, other components may be used to implement one or more of the steps described herein.

At block 605, the apparatus may send a request to at least one station (e.g., STA 316 of FIG. 3) associated with the apparatus to scan for information related to at least one neighboring AP operating in a neighborhood of the apparatus and report the information to the apparatus. In an aspect, the request for the information may be sent via a measurement request (or beacon request) as defined by IEEE 802.11 (IEEE 802.11k), such as the measurement request frame 400 described above, for example. At block 610, the apparatus may receive from the at least one associated station an information report including the information. In an aspect, the information report from at least one associated station may be received via a measurement report (or beacon report) as defined by IEEE 802.11 (IEEE 802.11k), such as the measurement response frame 450 described above, for example. In an aspect, the information includes an identifier (e.g., SSID) of the at least one neighboring AP. Sending the request may be performed by the processor 204, the initial scan enhancer 224, and/or the transmitter 210, for example. Receiving the report may be performed by the processor 204, the initial scan enhancer 224, and/or the receiver 212, for example.

At block 615, the apparatus may generate a neighborhood report (e.g., reduced neighbor report IE 500) related to the at least one neighboring AP, the neighborhood report including the information received from the at least one associated station. In an aspect, the neighborhood report includes a reduced version of the identifier of the at least one neighboring AP (e.g., hash value of the SSID). At block 620, the apparatus may transmit the neighborhood report to one or more other stations (e.g., STA 116 of FIG. 3) not associated with the apparatus to facilitate discovery of an AP of interest to the one or more other stations. The neighborhood report helps the one or more stations quickly locate the AP of interest and avoid the delay of having to scan all relevant channels to find the AP of interest during an initial scanning operation. In an aspect, the neighborhood report may be transmitted via a reduced neighbor report (e.g., reduced neighbor report IE 500). In another aspect, the neighborhood report may be transmitted, for example, via a beacon frame, a probe response frame, and/or a Fast Initial Link Setup (FILS) discovery frame. In a further aspect, the neighborhood report may be transmitted via the FILS discovery frame on a common channel (e.g., channel supported by all neighboring APs and STAs) different from an operating channel of the AP (AP 310). Accordingly, the transmitting at block 620 may include transmitting a clear-to-send (CTS) signal on the operating channel of the AP (AP 310) to disable communication on the operating channel prior to the FILS discovery frame being transmitted on the common channel that is different from the operating channel, wherein the AP 310 is a single-radio AP. In an aspect, the CTS signal may not be transmitted if the FILS discovery frame is to be sent on the AP 310's operating channel or when the common channel is the same as the AP 310's operating channel. In another aspect, the CTS signal may not be transmitted if the AP 310 is a dual-band AP (i.e., not a single-radio AP). For example, when the AP 310 includes one radio chain capable of operating on the social channel for sending the FILS Discovery frame and another radio chain capable of simultaneously operating on a primary channel for serving a STA, the AP 310 need not send the CTS signal prior to transmitting the FILS Discovery frame. Generating the neighborhood report may be performed by the processor 204 and/or the initial scan enhancer 224, for example. Transmitting the neighborhood report may be performed by the processor 204, the initial scan enhancer 224, and/or the transmitter 210, for example.

Figure 7:
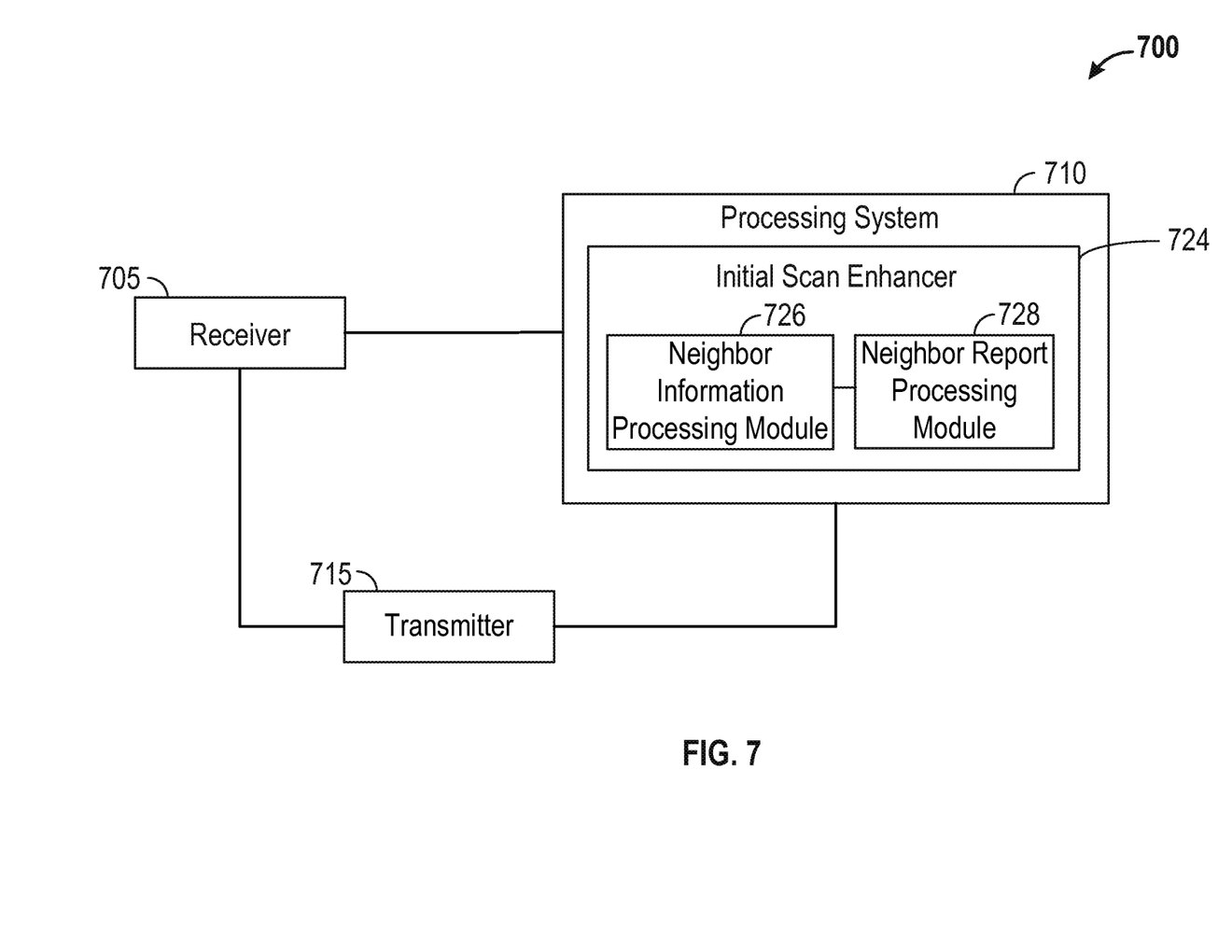
FIG. 7 is a functional block diagram of an example wireless communication device.

FIG. 7 is a functional block diagram of an example wireless communication device 700. The wireless communication device 700 may include a receiver 705, a processing system 710, and a transmitter 715. The processing system 710 may include an initial scan enhancer 724. The initial scan enhancer 724 may include a neighbor information processing module 726 and a neighbor report processing module 728. The processing system 710, the initial scan enhancer 724 (via the neighbor information processing module 726), and/or the transmitter 715 may be configured to send a request to at least one station (e.g. STA 316) associated with the communication device 700 to scan for information related to at least one neighboring AP operating in a neighborhood of the communication device 700 and report the information to the communication device 700. The processing system 710, the initial scan enhancer 724 (via the neighbor information processing module 726), and/or the receiver 705 may be configured to receive from the at least one associated station a report including the information. Furthermore, the processing system 710 and/or the initial scan enhancer 724 (via the neighbor report processing module 728) may be configured to generate a neighborhood report related to the at least one neighboring AP, wherein the neighborhood report includes the information received from the at least one associated station. Moreover, the processing system 710, the initial scan enhancer 724 (via the neighbor report processing module 728), and/or the transmitter 714 may be configured to transmit the neighborhood report to one or more other stations (e.g., STA 116 of FIG. 3) not associated with the communication device 700 to facilitate discovery of an AP of interest to the one or more other stations. The receiver 705, the processing system 710, the initial scan enhancer 724 (via the neighbor information processing module 726 and/or the neighbor report processing module 728), and/or the transmitter 715 may be configured to perform one or more functions discussed above with respect to blocks 605, 610, 615, and 620 of FIG. 6. The receiver 705 may correspond to the receiver 212. The processing system 710 may correspond to the processor 204. The transmitter 715 may correspond to the transmitter 210. The initial scan enhancer 724 (including the neighbor information processing module 726 and the neighbor report processing module 728) may correspond to the initial scan enhancer 124 and/or the initial scan enhancer 224.

Moreover, means for sending a request to at least one station associated with the AP to scan for information related to at least one neighboring AP operating in a neighborhood of the AP and report the information to the AP may comprise the processing system 710, the initial scan enhancer 724, the neighbor information processing module 726, and/or the transmitter 715. Means for receiving from the at least one associated station a report including the information may comprise the processing system 710, the initial scan enhancer 724, the neighbor information processing module 726, and/or the receiver 705. Means for generating a neighborhood report related to the at least one neighboring AP, the neighborhood report including the information received from the at least one associated station may comprise the processing system 710, the initial scan enhancer 724, and/or the neighbor report processing module 728. Means for transmitting the neighborhood report to one or more other stations not associated with the AP to facilitate discovery of an AP of interest to the one or more other stations may comprise the processing system 710, the initial scan enhancer 724, the neighbor report processing module 728, and/or the transmitter 715.

As used herein, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication at an access point (AP), comprising:
    sending a request to at least one station associated with the AP to scan for information related to at least one neighboring AP operating in a neighborhood of the AP and to report the information to the AP;
    receiving from the at least one associated station an information report including the information related to the at least one neighboring AP operating in the neighborhood of the AP, the information report indicating service set identifier (SSID) information corresponding to the at least one neighboring AP;
    modifying the SSID information corresponding to the at least one neighboring AP indicated by the received information report to generate a shortened version of the SSID information corresponding to the at least one neighboring AP indicated by the received information report;
    generating a neighborhood report, the neighborhood report including a reduced neighbor report information element (IE) that indicates the shortened version of the SSID information corresponding to the at least one neighboring AP indicated by the received information report; and
    transmitting the neighborhood report to one or more other stations not associated with the AP to facilitate discovery of an AP of interest to the one or more other stations based on the SSID information corresponding to the at least one neighboring AP.

2. The method of claim 1, wherein the neighborhood report is transmitted via at least one of:
    a beacon frame;
    a probe response frame; or
    a Fast Initial Link Setup (FILS) discovery frame as defined by IEEE 802.11ai.

3. The method of claim 2, wherein the neighborhood report is transmitted via the FILS discovery frame on a common channel different from an operating channel.

4. The method of claim 3, the transmitting comprising:
transmitting a clear-to-send (CTS) signal on the operating channel to disable communication on the operating channel prior to the FILS discovery frame being transmitted on the common channel different from the operating channel, wherein the AP is a single-radio AP.

5. The method of claim 1, wherein:
the request for the information is sent via a measurement request;
the information report from the at least one associated station including the information is received via a measurement report; and
the neighborhood report is transmitted via a reduced neighbor report.

6. The method of claim 5, wherein the measurement request is included in an IEEE 802.11 beacon request and the measurement report is included in an IEEE 802.11 beacon report.

7. An access point (AP) for wireless communication, comprising:
means for receiving, from at least one station associated with the AP, an information report indicating service set identifier (SSID) information related to at least one neighboring AP operating in a neighborhood of the AP;
means for modifying the SSID information corresponding to the at least one neighboring AP indicated by the received information report to generate a shortened version of the SSID information corresponding to the at least one neighboring AP indicated by the received information report;
means for generating a neighborhood report, the neighborhood report including a reduced neighbor report information element (IE) that indicates the shortened version of the SSID information corresponding to the at least one neighboring AP indicated by the received information report; and
means for transmitting the neighborhood report to one or more other stations not associated with the AP to facilitate discovery of an AP of interest to the one or more other stations based on the SSID information corresponding to the at least one neighboring AP.

8. The AP of claim 7, wherein the neighborhood report is transmitted via at least one of:
a beacon frame;
a probe response frame; or
a Fast Initial Link Setup (FILS) discovery frame as defined by IEEE 802.11ai.

9. The AP of claim 8, wherein the neighborhood report is transmitted via the FILS discovery frame on a common channel different from an operating channel.

10. The AP of claim 9, the means for transmitting configured to:
transmit a clear-to-send (CTS) signal on the operating channel to disable communication on the operating channel prior to the FILS discovery frame being transmitted on the common channel different from the operating channel, wherein the AP is a single-radio AP.

11. The AP of claim 7, further comprising:
means for sending a request to the at least one associated station to scan for information related to the at least one neighboring AP operating in the neighborhood of the AP and report the information to the AP, wherein:
the request for the information is sent via a measurement request,
the information report from the at least one associated station including the information is received via a measurement report, and
the neighborhood report is transmitted via a reduced neighbor report.

12. The AP of claim 11, wherein the measurement request is included in an IEEE 802.11 beacon request and the measurement report is included in an IEEE 802.11 beacon report.

13. An access point (AP) for wireless communication, comprising:
a memory; and
a processing system coupled to the memory and configured to:
receive, from at least one station associated with the AP, an information report including information related to at least one neighboring AP operating in a neighborhood of the AP, the information report indicating service set identifier (SSID) information corresponding to the at least one neighboring AP;
modify the SSID information corresponding to the at least one neighboring AP indicated by the received information report to generate a shortened version of the SSID information corresponding to the at least one neighboring AP indicated by the received information report;
generate a neighborhood report, the neighborhood report including a reduced neighbor report information element (IE) that indicates the shortened version of the SSID information corresponding to the at least one neighboring AP indicated by the received information report; and
transmit the neighborhood report to one or more other stations not associated with the AP to facilitate discovery of an AP of interest to the one or more other stations based on the SSID information corresponding to the at least one neighboring AP.

14. The AP of claim 13, wherein the neighborhood report is transmitted via at least one of:
a beacon frame;
a probe response frame; or
a Fast Initial Link Setup (FILS) discovery frame as defined by IEEE 802.11ai.

15. The AP of claim 14, wherein the neighborhood report is transmitted via the FILS discovery frame on a common channel different from an operating channel.

16. The AP of claim 15, the processing system further configured to:
transmit a clear-to-send (CTS) signal on the operating channel to disable communication on the operating channel prior to the FILS discovery frame being transmitted on the common channel different from the operating channel, wherein the AP is a single-radio AP.

17. The AP of claim 13, wherein the processing system is further configured to:
send a request to the at least one associated station to scan for information related to the at least one neighboring AP operating in the neighborhood of the AP and report the information to the AP, wherein:
the request for the information is sent via a measurement request,
the information report from the at least one associated station including the information is received via a measurement report, and
the neighborhood report is transmitted via a reduced neighbor report.

18. The AP of claim 17, wherein the measurement request is included in an IEEE 802.11 beacon request and the measurement report is included in an IEEE 802.11 beacon report.

19. A non-transitory computer-readable medium of an access point (AP), the non-transitory computer-readable medium having instructions stored thereon that, when executed, cause the AP to:
- receive, from at least one station associated with the AP, an information report including information related to at least one neighboring AP operating in a neighborhood of the AP, the information report indicating service set identifier (SSID) information corresponding to the at least one neighboring AP;
- modify the SSID information corresponding to the at least one neighboring AP indicated by the received information report to generate a shortened version of the SSID information corresponding to the at least one neighboring AP indicated by the received information report;
- generate a neighborhood report, the neighborhood report including a reduced neighbor report information element (IE) that indicates the shortened version of the SSID information corresponding to the at least one neighboring AP indicated by the received information report; and
- transmit the neighborhood report to one or more other stations not associated with the AP to facilitate discovery of an AP of interest to the one or more other stations based on the SSID information corresponding to the at least one neighboring AP.

20. The non-transitory computer-readable medium of claim 19, wherein the neighborhood report is transmitted via at least one of:
- a beacon frame;
- a probe response frame; or
- a Fast Initial Link Setup (FILS) discovery frame as defined by IEEE 802.11ai.

21. The non-transitory computer-readable medium of claim 20, wherein the neighborhood report is transmitted via the FILS discovery frame on a common channel different from an operating channel.

22. The non-transitory computer-readable medium of claim 21, further comprising code to:
- transmit a clear-to-send (CTS) signal on the operating channel to disable communication on the operating channel prior to the FILS discovery frame being transmitted on the common channel different from the operating channel, wherein the AP is a single-radio AP.

23. The non-transitory computer-readable medium of claim 19, further comprising code to:
- send a request to the at least one associated station to scan for information related to the at least one neighboring AP operating in the neighborhood of the AP and report the information to the AP, wherein:
- the request for the information is sent via a measurement request,
- the information report from the at least one associated station including the information is received via a measurement report, and
- the neighborhood report is transmitted via a reduced neighbor report.

24. The non-transitory computer-readable medium of claim 23, wherein the measurement request is included in an IEEE 802.11 beacon request and the measurement report is included in an IEEE 802.11 beacon report.

25. The method of claim 1, wherein the shortened version of the SSID information corresponding to the at least one neighboring AP indicated by the received information report includes a hash value of the SSID corresponding to the at least one neighboring AP.

26. The AP of claim 7, wherein the shortened version of the SSID information corresponding to the at least one neighboring AP indicated by the received information report includes a hash value of the SSID corresponding to the at least one neighboring AP.

27. The AP of claim 13, wherein the shortened version of the SSID information corresponding to the at least one neighboring AP indicated by the received information report includes a hash value of the SSID corresponding to the at least one neighboring AP.

28. The non-transitory computer-readable medium of claim 19, wherein the shortened version of the SSID information corresponding to the at least one neighboring AP indicated by the received information report includes a hash value of the SSID corresponding to the at least one neighboring AP.

* * * * *